Aug. 2, 1932.  A. H. KATTERJOHN  1,869,595
FLUID-OPERATED TOOL
Filed Sept. 20, 1929
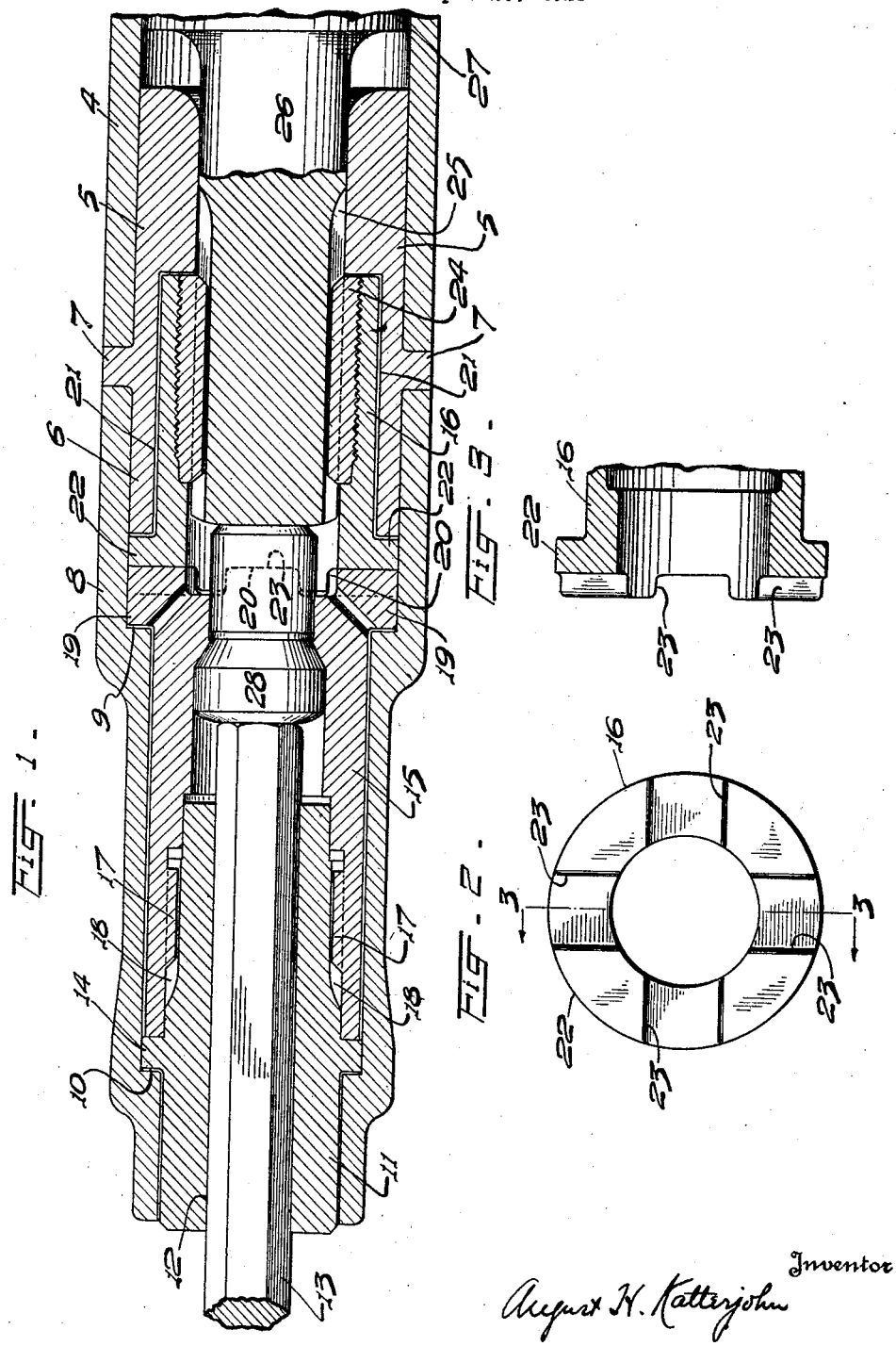
Inventor
August H. Katterjohn
By
Attorney Patented Aug. 2, 1932

1,869,595

UNITED STATES PATENT OFFICE

AUGUST H. KATTERJOHN, OF DENVER, COLORADO, ASSIGNOR TO GARDNER-DENVER COMPANY, OF DENVER, COLORADO, A CORPORATION OF DELAWARE

FLUID OPERATED TOOL

Application filed September 20, 1929. Serial No. 394,081.

The present invention relates more particularly to chucks for rock drills, the object being to provide a structure in which the parts subject to wear, are readily removable and replaceable and in which the bearing and weight of the chuck structure is widely distributed.

The preferred embodiment of the invention is illustrated in the accompanying drawing, wherein:

Figure 1 is a longitudinal sectional view through the chuck end of a rock drill.

Figure 2 is a front end elevation of the rear section of the chuck driver sleeve member.

Figure 3 is a longitudinal sectional view on the line 3—3 of Figure 2.

In the embodiment disclosed the barrel or cylinder of the tool is shown at 4, and has fitted into its front end the rear portion 5 of a bushing. This bushing has a front portion 6 projecting beyond the barrel and having an outstanding annular flange 7 abutting said barrel. A chuck housing 8 has its rear end fitted on to the projecting portion 6 of the bushing and abutted against the flange 7. This housing has in its rear portion and in line with the front end of the projecting portion of the bushing 6, a rearwardly faced shoulder 9 that is spaced from the front end of the portion 6. The chuck housing 8 has at its front end a rearwardly faced internal annular shoulder 10 of less diameter than the shoulder 9. Preferably the housing is in one piece as shown.

In the front end of the housing 8 is a rotatable chuck 11 having a suitable socket 12 for the reception of a steel 13 or other tool. This chuck 11 has a peripheral outstanding annular flange 14 that is behind and bears against the shoulder 10. A driver sleeve member is located in the housing and consists of a front section 15 and a rear section 16. The front end of the front section fits around the rear end of the chuck behind the flange 14 and is abutted against said flange. It is provided with inset keys or gibs 17 slidably engaging in grooves 18 in the rear end of the chuck 11. The rear end of the driver sleeve section 15 is provided with an enlarged head 19 that is abutted against the rear shoulder 9 and is provided with a plurality of radially disposed rearwardly extending clutch lugs or teeth 20. The rear driver sleeve section 16 is fitted into the front portion of the bushing 5 which has an enlarged bore 21 for the purpose and the front end of this section 16 has an enlarged head 22 at its front end which head is provided with sockets 23 that receive the lugs 20 so that the front and rear sections are interlocked and will rotate together. The heads 19 and 22 fit between the rear shoulder 9 of the chuck housing 8 and the front end of the forward extension 6 of the bushing 5.

In the rear section 16 is mounted the usual driver nut 24 that is splined as shown at 25 to the hammer extension 26 of the usual hammer piston 27. In the present structure this hammer piston operates on a tappet 28 fitted in the front driver sleeve section 15 and projecting rearwardly into the rear section 16 and into the path of the hammer extension 26. The rear end of the tool shank 13 abuts the front end of the tappet.

This structure has proven a very satisfactory one in operation because it permits the removal and ready re-assembling of the chuck structure and the substitution of parts that are subject to excessive wear. More than that it will be noted that the chuck driver and chuck have bearings against the shoulders 9 and 10 of the housing so that the weight of the parts and the wear is distributed.

From the foregoing, it is thought that the construction, operation and many advantages of the herein described invention will be apparent to those skilled in the art without further description and it will be understood that various changes in the size, shape, proportion and minor details of construction may be resorted to without departing from the spirit or sacrificing any of the advantages of the invention.

What I claim, is:

1. In a fluid operated tool, the combination with a barrel and a hammer piston therein, of a chuck housing at the front end of the barrel having front and rear rearwardly facing internal annular bearing shoulders, a chuck journaled in the front portion of the housing and having an outstanding annular flange bearing against the front shoulder, a chuck driver sleeve member journaled in the housing and slidably interlocked with the chuck behind the flange, said sleeve member having an annular flange bearing against the rear shoulder, a driving sleeve having an annular flange corresponding to that carried by the driver sleeve, interlocking fingers carried upon the abutting faces of both flanges, and a splined connection between the driving sleeve and the piston.

2. In a fluid operated tool, in combination with a barrel, and a hammer piston therein, of a chuck housing at the front end of the barrel, having a plurality of rearwardly facing internal annular bearing shoulders, a chuck journaled in the front portion of the housing and having a bearing against one of the shoulders, a chuck driver sleeve journal in the housing and slidably interfitting with the chuck and having an outstanding flange forming a bearing against the other of said shoulders, and said sleeve member comprising separable sections coupled rearwardly of the last said shoulder and through the outstanding flange, and a splined section between the rear section of the sleeve and the piston.

In testimony whereof, I affix my signature.

AUGUST H. KATTERJOHN.